United States Patent [19]
Yoshida et al.

[11] 4,431,769
[45] Feb. 14, 1984

[54] BINDER COMPOSITION FOR PAPER-COATING MATERIALS

[75] Inventors: Eiichi Yoshida, Tokyo; Susumu Tago, Kanagawa; Kunio Imamura, Saitama, all of Japan

[73] Assignee: Showa Denko Kabushiki Kaisha, Tokyo, Japan

[21] Appl. No.: 329,464

[22] Filed: Dec. 10, 1981

[30] Foreign Application Priority Data

| Mar. 31, 1981 | [JP] | Japan | 56-46438 |
| Mar. 31, 1981 | [JP] | Japan | 56-46439 |
| Apr. 1, 1981 | [JP] | Japan | 56-47167 |
| Apr. 1, 1981 | [JP] | Japan | 56-47168 |

[51] Int. Cl.$^3$ ............................................. C08L 39/00
[52] U.S. Cl. ................................................... 524/555
[58] Field of Search ........................................ 524/555

[56] References Cited

U.S. PATENT DOCUMENTS

| 2,959,574 | 11/1960 | Woodberry | 524/555 |
| 3,168,500 | 2/1965 | Suen et al. | 524/555 |
| 3,350,338 | 10/1967 | Savage | 524/555 |
| 3,927,199 | 12/1975 | Micchelli et al. | 524/555 |
| 4,239,671 | 12/1980 | Fink et al. | 524/555 |
| 4,331,787 | 5/1982 | Fairchok et al. | 524/555 |
| 4,339,505 | 7/1982 | Ragas et al. | 524/555 |

FOREIGN PATENT DOCUMENTS 1049871  2/1959  Fed. Rep. of Germany ...... 524/555

OTHER PUBLICATIONS

Hackh's Chemical Dictionary–p. 386.

*Primary Examiner*—Joseph L. Schofer
*Assistant Examiner*—N. Sarofim
*Attorney, Agent, or Firm*—Sughrue, Mion, Zinn, Macpeak and Seas

[57] ABSTRACT

A binder composition for paper-coating materials having excellent binder performance is disclosed, which comprises an aqueous solution of one or more water-soluble copolymers of (A) 50 to 95 wt % of acryl- or methacrylamide and (B) 5 to 50 wt % of at least one acrylic- or methacrylic acid derivative such as alkyl or hydroxyalkyl esters, N-methylolamides and nitriles.

8 Claims, No Drawings

BINDER COMPOSITION FOR PAPER-COATING MATERIALS

FIELD OF THE INVENTION

The present invention relates to binder compositions for paper-coating materials.

BACKGROUND OF THE INVENTION

In recent years, light-sensitive recording system, magnetic recording system and heat-sensitive recording system have been increasingly developed and put in practical use. In particular, the heat-sensitive recording system has advantages in that (1) the formation of color is performed in one step, and therefore, no development step is needed, (2) the construction and maintenance of an apparatus for use in the heat-sensitive recording system are easy, and (3) a heat-sensitive recording sheet is similar in the touch to that of ordinary paper and is inexpensive. Thus, the heat-sensitive recording system is now utilized in various fields such as an output section of a computer, a printer section of an electronic calculator, etc., a recording section of a medical measuring apparatus, a facsimile, an automatic ticket-vending machine, and a heat-sensitive copying apparatus.

Light-sensitive recording paper, magnetic recording paper and heat-sensitive recording paper for use in above systems are usually prepared by the same manner as used in the preparation of usual coated papers such as art paper and coat paper. In preparing such art and coat papers, a coating material prepared by dispersing an inorganic pigment (e.g., barium sulfate, titanium oxide, calcium carbonate, satin white, clay or kaolin) along with a binder, (e.g., casein, starch or synthetic latex) in water is coated on a base paper, and then, dried. In addition, mechanical treatments such as supercalendering are applied thereto. In general, such binders have also an ability to permit uniform dispersion of the above-described pigment in the coating material. In some cases, a dispersant is additionally used.

Similarly, light-sensitive recording papers, magnetic recording papers and heat-sensitive recording papers are prepared by dispersing uniformly a light-sensitive substance (e.g., diazonium compound), a magnetic substance (e.g., γ-iron oxide) and a mixture of a leuco dye-type color former (e.g., a fluoran dye), and a color developer (e.g., a phenol compound), respectively, in water along with a binder to prepare the corresponding coating materials, and coating the coating materials on a base paper.

Binders for use in coating materials which are used in the preparation of such coated papers are desired to meet various requirements such as (1) they permit easy and good dispersion and adhesion of various additives such as pigment, dye and magnetic powder in a coating material, (2) they provide a uniform and strong coating film, (3) they have good water resistance, (4) they have good viscosity stability, (5) they have excellent workability, and (6) they are inexpensive. In addition, the binders for use in leuco dye-type heat-sensitive recording paper are required to exhibit good response to heat, to prevent formation of fog and deterioration of a thermal head, and to prevent the recording paper from sticking to the head. Further, it is desired for the binder used in magnetic recording paper to permit orientation of magnetic materials upon coating on a base paper and to have high bonding force whereby good abrasion resistance of the recording material can be attained with a small amount of the binder, resulting in an improved output level and running property.

Conventional binders include water-soluble substances such as polyvinyl alcohol, starch, and modified products thereof, casein, gelatin, soybean protein, carboxymethyl cellulose, gum arabic, methyl cellulose, hydroxyethyl cellulose, sodium alginate, polyacrylamide, poly(sodium acrylate), and an alkali-modified product of a styrene-maleic anhydride copolymer, and aqueous emulsions of a styrene-butadiene copolymer, a styrene-butadiene-acrylonitrile copolymer, an ethylene-vinyl acetate copolymer, a vinylidene chloride-acrylate copolymer, a vinylidene chloride-acrylonitrile copolymer, an acrylonitrile-acrylate copolymer, a polyurethane resin, a chlorinated polypropylene resin, a butadiene-acrylonitrile copolymer, and a vinyl acetate resin.

Water-soluble substances as described above (other than styrene-maleic anhydride copolymer alkali-modified products), however, have poor water resistance. They are, therefore, not necessarily satisfactory since various problems arise although they are usually used in combination with an agent to improve the water resistance thereof. On the other hand, styrene-maleic anhydride copolymer alkali-modified products and synthetic resin-based aqueous emulsions have poor bonding force, though they have good water resistance. Further, when the styrene-maleic anhydride copolymer alkali-modified products are used as a binder for the heat-sensitive recording paper, it suffers from the defect that it easily causes the deterioration of a thermal head. Also, the synthetic resin-based aqueous emulsions have disadvantages for the heat-sensitive recording paper in that they cause the formation of fog and because of their poor heat resistance the heat-sensitive recording paper sticks to a thermal head during recording, and disadvantages for the magnetic recording paper in that they do not have sufficient bonding force, providing poor abrasion resistance, low output level and poor running property. Thus, almost all conventional binders are not sufficiently satisfactory for practical use.

SUMMARY OF THE INVENTION

Accordingly, an object of the present invention is to provide a binder composition for use in paper-coating materials, having excellent binder performances such as high dispersibility and affinity to various additives used in a coating material, good water-resistance, good viscosity stability, formation of a uniform and strong coating film, etc.

A further object of the present invention is to provide a binder composition suitable for a leuco dye-type heat-sensitive recording paper, capable of preventing formation of fog and deterioration of a thermal head used for thermal recording, further keeping the recording paper from sticking to the head during recording.

A still further object of the present invention is to provide a binder composition suitable for a magnetic recording paper, capable of improving abrasion resistance, running property and output level of the magnetic recording paper.

Other objects of the present invention will be apparent from the description given hereinafter.

As a result of extensive studies to develop binder compositions for use in paper-coating materials, which meet the above-described requirements, and in particular, which are useful for the preparation of recording papers such as a heat-sensitive recording paper, a magnetic recording paper, a light-sensitive recording paper and the like, it has now been found that such binder compositions can be obtained using aqueous solutions of specific acryl- or methacrylamide-based copolymers, more specifically, that an aqueous solution of one or more water-soluble copolymers of (A) 50 to 95 wt% of acryl- or methacrylamide and (B) 5 to 50 wt% of at least one acrylic or methacrylic acid derivative such as alkyl or hydroxyalkyl esters, N-methylolamides and nitriles exhibits excellent performance as the binder composition.

DETAILED DESCRIPTION OF THE INVENTION

In order to meet the above-described requirements, it is necessary for polymeric binders to have good affinity to paper, high bonding force, and water-solubility which is not unnecessarily high, but to an extent that after coating on a paper and drying, they are sparingly soluble in water. Homopolymers of acryl- or methacrylamide have poor water resistance and, therefore, are not suitable for practical use. According to the present invention, the water resistance is improved by copolymerizing acryl- or methacrylamide with comonomers having analogous chemical structure and physical properties thereto having an alkyl group or cyano group to introduce these groups at side-chains of the acryl- or methacrylamide-based copolymer. In particular, introduction of an alkyl group having a hydroxy group improves not only water resistance but also affinity to paper and bonding force, providing binders having excellent performance.

The term "paper" used herein includes not only a wood pulp paper but in addition a synthetic pulp paper and a synthetic paper which have hydrophilic groups.

The water-soluble copolymers which can be used in the present invention include copolymers of (A) acryl- or methacrylamide and (B) at least one of acrylic- or methacrylic acid derivatives represented by the general formulae (I), (II) and (III).

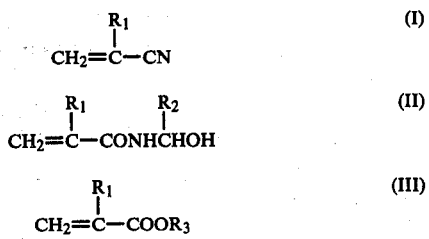

wherein $R_1$ and $R_2$ each represents hydrogen atom and methyl group; $R_3$ represents a $C_{1-4}$ alkyl group (e.g., methyl, ethyl, propyl, butyl group), a $C_{1-4}$ hydroxyalkyl group having 1 to 3 hydroxy groups one of which may be substituted by a halogen atom (e.g., chlorine atom) or may form an ether bond with a $C_{1-4}$ alkyl group or a $C_{1-4}$ hydroxyalkyl group, or a cyclic ether by dehydration with an adjacent hydroxy group (e.g., hydroxyethyl, 2-hydroxypropyl, 3-chloro-2-hydroxypropyl, 3-butoxy-2-hydroxypropyl, 2,3-epoxypropyl group), $-(CH_2CH_2O)_nR_4$, $-CH_2CH_2N(R_5,R_6)$ and $-CH_2CH_2\oplus N(R_5,R_6,R_7)Z^\ominus$; $R_4$ represents hydrogen atom and methyl group; $R_5$, $R_6$ and $R_7$ each represents a $C_{1-2}$ alkyl group; Z represents hydroxy ion or a halogen ion (e.g., chlorine ion); and n is an integer of 2 to 25. Of these, copolymers obtained using as monomer component (B) a compound $CH_2=CR_1-COOR_8$ with or without a compound $CH_2=CR_1-COOR_9$, or N-methylol acryl- or methacrylamide with acrylo- or methacrylonitrile are particularly preferred for the purpose of the present invention, wherein $R_1$ has the same meanings as defined above, $R_8$ represents a $C_{1-4}$ hydroxyalkyl group having one hydroxy group and $R_9$ represents a $C_{1-4}$ alkyl group. The copolymers of the present invention may be used alone or as an admixture thereof in an aqueous medium. In particular, it is preferred to use copolymers obtained using $CH_2=CR_1-COOR_8$ and $CH_2=CR_1-COOR_9$ as component (B), respectively, in the form of admixture.

As is described above, the water resistance of the copolymers can be increased by increasing the proportion of component (B). However, when the proportion of component (B) such as the alkyl esters is excessively increased, the water solubility of the copolymer is sometimes lost. While an excess proportion of the hydroxyalkyl esters does not give rise to the above problem, cross-linking between the resulting copolymers occurs, increasing the viscosity and finally, causing gelation, and thus, no desired copolymer can be obtained. Therefore, the proportions of components (A) and (B) are generally 50 to 95 wt%, preferably 70 to 90 wt%, and 5 to 50 wt%, preferably 10 to 30 wt%, respectively.

The copolymers of the present invention are used in the form of an aqueous solution. The concentration of the copolymer is generally from 1 to 20 wt%. When the concentration is less than 1 wt% it is not effective for the purpose of the present invention, and when it is more than 20 wt% the binder composition becomes too viscous, resulting in poor workability.

Although a process for the production of the binder composition of the invention is not critical, they are usually prepared by a method as described hereinafter. Of course, they may be prepared by other methods.

An aqueous solution of components (A) and (B) having the total monomer concentration of 10 to 30% by weight, preferably 15 to 25% by weight, is first prepared, and a persulfuric acid salt, or a redox system of a persulfuric acid salt and an amine or sulfurous acid salt is added thereto as a catalyst. Then, they are reacted at room temperature (5° to 30° C.) for about 0.5 to 2 hours. (While polymerization is started at room temperature, the temperature rises as the polymerization proceeds, usually up to about 70° C. at the end of reaction. Cooling is not necessary to carry out, however, unless local overheating occurs.)

Preferred examples of salts of persulfuric acid and sulfurous acid are water-soluble salts such as sodium salt, potassium salt, and ammonium salt. Preferred examples of amines include primary amines such as monoethanolamine, hexamethylenediamine and aniline, secondary amines such as diethanolamine and monomethylaniline, and tertiary amines such as triethanolamine, dimethylaniline, pyridine, and picoline. Of these compounds, a redox catalyst comprising ammonium persulfate and triethanolamine is most effective and preferred.

Although the amount of the catalyst used is not necessarily limited, the persulfuric acid salt and amine are desirably added in an amount of about 0.1 to 2.0% by weight and about 0.5 to 20% by weight, respectively, based on the total weight of the monomers.

In order to form a polymeric coating film having sufficient strength on paper, it is preferred for the copolymer to have a high molecular weight. The use of copolymers having too high molecular weights, however, increases the viscosity of the ultimate coating material and deteriorates the workability thereof. Aqueous copolymer solutions having a viscosity (as a 20% aqueous solution at 20° C.) of about 2,000 to 60,000 centipoises provide a relatively high coating film strength and exhibit good workability. In order to prepare aqueous copolymer solutions having a viscosity falling within the above range, it is preferred to adjust the amount of the catalyst used within the range as described hereinbefore.

The monomer concentration is selected from the range as described hereinbefore in order to adjust the viscosity of the aqueous copolymer solution resulting from the polymerization within the above-described range.

The binder composition of the invention can be used in the preparation of ordinary coated papers such as art paper and coat paper, and in a coating material for the preparation of heat-sensitive recording paper, magnetic recording paper, light-sensitive recording paper and the like.

In particular, it is useful in the preparation of conventional leuco dye-type heat-sensitive recording paper. Since the binder composition of the invention can effectively disperse (or isolate) each component used in the heat-sensitive recording paper such as a color former, a color developer, etc., the formation of fog due to contact of color former and color developer is prevented. Further, using the binder composition the resulting heat-sensitive recording paper is free from the deterioration of a thermal head and does not stick to the thermal head during recording. This would be because that the copolymer of the binder composition does not contain an alkali metal salt and has good bonding force.

Aqueous coating compositions for the leuco dye-type heat-sensitive recording paper comprise, other than the binder composition, a leuco dye (a color former), a color developer and optionally a filler. Leuco dyes which are used as a color former include triphenylmethane-based dyes, fluoran-based dyes, Auramine-based dyes, phenothiazine-based dyes and spiropyran-based dyes. Typical examples are set forth below although the invention is not limited thereto.

Triphenylmethane-based dyes 3,3-Bis(p-dimethylaminophenyl)phthalide
3,3-Bis(p-dimethylaminophenyl)-6-dimethylaminophthalide (Crystal Violet Lactone)
3,3-Bis(p-dimethylaminophenyl)-6-aminophthalide
3,3-Bis(p-dimethylaminophenyl)-6-nitrophthalide
3,3-Bis(p-dibutylaminophenyl)phthalide
3,3-Bis(p-dimethylaminophenyl)-4,5,6,7-tetrachlorophthalide Fluoran-based dyes 3-Dimethylamino-6-methoxyfluoran
7-Acetoamino-3-dimethylaminofluoran
3-Dimethylamino-5,7-dimethylfluoran
3-Diethylamino-5,7-dimethylfluoran
3,6-Bis-β-methoxyethoxyfluoran
3,6-Bis-β-cyanoethoxyfluoran
3-Diethylamino-6-methyl-7-p-butylanilinofluoran
3-Diethylamino-6-methyl-7-chlorofluoran Auramine-based dyes 4,4'-Bisdimethylamino-3,4-chlorophenylleucoauramine
4,4'-Bisdimethylaminopiperazinehydrol Phenothiazine-based dyes p-Methoxybenzoylmethylene blue Spiropyran-based dyes 8'-Methoxybenzoindolynospiropyran
3-Phenyl-8'-methoxybenzoindolynospiropyran
6'-Chloro-8'-methoxybenzoindolynospiropyran
5,6'-Dichloro-8'-methoxybenzoindolynospiropyran
4,7,8'-Trimethoxybenzoindolynospiropyran Color developers which react with the above-described color former include phenol compounds and organic acids. The color developers as listed below are desirable in that they are solid at ordinary temperature, and liquefy or vaporize at temperatures of 50° C. or more.

Phenol compounds 4,4'-Isopropylidenediphenol (bisphenol A)
4-tert-Butylphenol
4-tert-Octylphenol
4-tert-Amylphenol
p-Phenylphenol
2,2-Bis(p-hydroxyphenyl)butane
2,2-Bis(p-hydroxyphenyl)isohexane
4-Hydroxydiphenyloxyde
α-Naphthol
β-Naphthol
Methyl-4-hydroxybenzoate
4'-Hydroxyacetophenone
4-tert-Octylcatechol
2,2'-Dihydroxydiphenyl
2,2'-Methylene bis(4-chlorophenol)
2,2'-Methylene bis(4-methyl-6-tert.butylphenol)
4,4'-Isopropylidene bis(2-chlorophenol)
4,4'-Isopropylidene bis(2,6-dibromophenol)
4,4'-Isopropylidene bis(2,6-dichlorophenol)
4,4'-Isopropylidene bis(2-methylphenol)
4,4'-Isopropylidene bis(2,6-dimethylphenol)
4,4'-Isopropylidene bis(2-tert-butylphenol)
4,4'-sec-Butylidene bis(2-methylphenol)
4,4'-Cyclohexylidenediphenol
4,4'-Cyclohexylidene bis(2-methylphenol)
2,2'-Thio-bis(4,6-dichlorophenol)

Organic acids

Stearic acid, benzoic acid, salicylic acid, succinic acid, gallic acid, homopolymerization oligomers of organic acid monomers such as acrylic acid, methacrylic acid and itaconic acid, and copolymerization oligomers of such organic acid monomers and styrene, acrylamide or the like. Suitable molecular weight of these oligomers is 2,000 or less.

The color developer is typically added in an amount of 1 to 10 parts by weight, preferably 2 to 5 parts by weight, per part by weight of the color former.

The above-described color formers or color developers can be used alone or as a mixture comprising two or more thereof.

Fillers which can be used in the aqueous coating composition include inorganic substances such as calcium carbonate, talc, titanium oxide, clay, and kaolin, and synthetic resins such as polystyrene. These substances can be used alone or in combination thereof. The filler can be added in an amount of 0 to 5 parts by weight per part by weight of the color former.

The weight ratio of the total amount of color former/color developer/filler to the amount of the copolymer contained in the binder composition of the present invention is appropriately 1/0.1 to 1/0.3. When the amount of the copolymer added is too small, the bonding force is weakened, leading to the loss of the performance as a binder, whereas it is too large, the sensitivity of color formation is reduced.

In addition to the color former, color developer, filler, and the binder, wax emulsion, a softening agent and a sensitizing agent may be added, if desired.

The aqueous coating compositions for leuco dye-type heat-sensitive paper can be prepared and coated on a base paper by conventional manners, as described in U.S. Pat. Nos. 3,451,338, 3,539,375 and Japanese Patent Application (OPI) No. 41235/78 (the term "OPI" as used herein refers to a "published unexamined Japanese patent application"). For example, a color former and a color developer are uniformly dispersed in the binder composition of the present invention with water and other additives, respectively, and then the resulting dispersions are mixed to prepare the coating composition.

The binder composition of the present invention is also advantageous for an aqueous coating composition of conventional magnetic recording paper because it permits orientation of magnetic materials used therein upon coating on a base paper and has high bonding force, providing a magnetic recording paper having high abrasion resistance, improved output level and good running property. Aqueous coating composition of the magnetic recording paper comprises, in addition to the binder composition, a magnetic material (e.g., γ-iron oxide), and a dispersing agent (e.g., casein, alkali-hydrated product of styrene-maleic anhydride copolymer, caboxymethyl cellulose and sodium pyrophosphate). The binder composition is added in the aqueous coating composition such that the amount of the copolymer in the binder composition ranges generally from about 10 to 20 wt% based on the magnetic material. When it is lower than about 10 wt%, the abrasion resistance cannot be improved, and with more than about 20 wt%, the output level and running property cannot be improved and it is uneconomical.

The aqueous coating composition for magnetic recording paper can be prepared and coated on a base paper by conventional manners, as described in Japanese Patent Publication No. 46922/74. For example, a magnetic material is added in an aqueous solution containing a dispersing agent, an antifoaming agent, etc., and dispersed for 0.5 to 2 hours by ball mill, and the resulting dispersion is uniformly mixed with the binder composition of the present invention.

Further, the binder composition can be used in the preparation of light-sensitive recording paper, such as a photocurable-type recording paper. Suitable light-sensitive materials used therein include diazonium compounds, condensates of p-aminodiphenyldiazonium chloride and formaldehyde, benzidinetetrazonium zinc chloride complex salts, silver salts, dichromates and the like. The weight ratio of the copolymer in the binder composition to the light-sensitive material is generally from 20/1 to 10/1.

A light-sensitive coating composition can be prepared by mixing an aqueous solution, dispersion or emulsion of a light-sensitive material and the binder composition with stirring, and if desired, further adding gradually a lower alcohol such manner that the light-sensitive material is not precipitated. Water may be added to adjust the concentration of components contained in the coating composition. Conventional binder such as casein, polyvinyl alcohol can also be added as well as the binder composition of the present invention. The resulting coating composition is then coated on a base paper to form a light-sensitive layer having 1 to 10μ by conventional means such as roll coating, air knife coating, blade coating, etc., and dried at 60° to 100° C. for 10 seconds to 10 minutes.

The invention provides a binder for a paper-coating material, which is useful particularly for the preparation of recording paper. The binder of the invention can be used in combination with other water-soluble and water-dispersible binders. Thus, the binder of the invention can find various applications.

The following Examples are given to illustrate the invention in greater detail, and are not intended to limit the scope of the invention. In the Examples, all parts and percents are by weight.

EXAMPLE 1

(1) Preparation of Binder

A mixture of 85 parts of acrylamide (component (A)), 15 parts of 2-hydroxypropyl methacrylate (component (B)) and 400 parts of water was placed in a three-necked flask equipped with a thermometer and a nitrogen introduction tube, and nitrogen was bubbled therethrough for one hour. Thereafter, the liquid temperature was adjusted to 20° C., and an aqueous solution of 8 parts of triethanolamine and 0.8 part of ammonium persulfate was added thereto to start the polymerization. The polymerization was continued for one hour after the temperature reached the maximum level to obtain a 20% aqueous copolymer solution. The viscosity of the aqueous copolymer solution was 50,000 centipoises at 20° C. The aqueous copolymer solution thus-prepared was diluted with water to adjust the concentration to 10%, and the thus-obtained 10% aqueous copolymer solution was used as a binder composition.

(2) Preparation of Heat-Sensitive Coating Material

A mixture (I) of 4 parts of Crystal Violet Lactone, 20 parts of the binder composition as prepared in (1) above and 26 parts of water, and a mixture (II) of 16 parts of bisphenol A, 20 parts of the binder composition, 3 parts of calcium carbonate and 11 parts of water were mixed separately in a ball mill for 3 hours to prepare the corresponding dispersions. In preparing a recording paper, the dispersions were mixed and fully stirred to obtain a heat-sensitive coating composition (A).

Similarly, the dispersions of a mixture (III) of 4 parts of 3-dimethylamino-5,7-dimethylfluoran, 20 parts of the binder composition and 26 parts of water, and of a mixture (IV) of 16 parts of p-phenylphenol, 20 parts of the binder composition, 3 parts of talc and 11 parts of water were mixed to prepared a heat-sensitive coating composition (B).

For comparison, a heat-sensitive coating composition (C) was prepared in the same manner as in the preparation of the heat-sensitive coating composition (A) except that a 10% aqueous solution of polyacrylamide (the viscosity of a 20% aqueous solution of the polyacrylamide at 20° C. was 23,000 centipoises) was used as a binder composition in place of the aqueous copolymer solutio of the invention.

(3) Production of Recording Paper and Tests

The heat-sensitive coating compositions (A), (B) and (C) as obtained in (2) above were coated on the surface of high quality paper (60 g/m$^2$) using a wire bar in a coating amount (dry) of 4.0 g/m$^2$ to prepare heat-sensitive recording papers (A), (B), and (C), respectively.

The heat-sensitive recording papers (A), (B) and (C) were printed at a temperature of 130° C. The Macbeth density was as follows: the recording paper (A): 0.86; the recording paper (B): 0.85; and the recording paper (C): 0.86. The recording papers (A) and (B) exhibited water resistance to an extent that when the printed area was damped with 0.2 g of a water droplet for one minute, and was rubbed with a finger, the peeling of the printed area did not occur. On the other hand, when the recording paper (C) was subjected to the same test, the peeling of the printed area was observed.

EXAMPLES 2 TO 60

In the same manner as in Example 1, heat-sensitive recording papers were prepared while changing components (A) and (B) as shown in Table 1 below and tested. It was found that they had good performance nearly equal to the recording papers (A) and (B) in Example 1. Of these, the heat-sensitive recording papers obtained in Examples 2, 5, 20, 24 and 32 had excellent performance as well as those in Example 1.

TABLE 1

| Example No. | Component (A) Monomer | Parts | Component (B) Comonomer | Parts | Comonomer | Parts | Comonomer | Parts | Remark* (cp) |
|---|---|---|---|---|---|---|---|---|---|
| 2 | ACA | 80 | M—COOCH$_2$CHCH$_3$<br>\|<br>OH | 20 | — | | — | | 30,000 |
| 3 | " | 85 | A—CONHCH$_2$OH | 15 | — | | — | | 40,000 |
| 4 | " | 90 | M—COOCH$_2$CH$_2$OH | 10 | — | | — | | 30,000 |
| 5 | MCA | 85 | A—COOCH$_2$CHCH$_3$<br>\|<br>OH | 15 | — | | — | | 35,000 |
| 6 | " | 90 | M—COOCH$_2$CH$_2$OH | 10 | — | | — | | 35,000 |
| 7 | ACA | 85 | M—CONHCH$_2$OH | 15 | — | | — | | 60,000 |
| 8 | " | 80 | " | 20 | — | | — | | 30,000 |
| 9 | " | 85 | " | 15 | — | | — | | 40,000 |
| 10 | " | 90 | " | 10 | — | | — | | 30,000 |
| 11 | MCA | 85 | M—CONHCH$_2$OH | 15 | — | | — | | 35,000 |
| 12 | " | 90 | " | 10 | — | | — | | 35,000 |
| 13 | ACA | 80 | A—CN | 20 | — | | — | | 8,000 |
| 14 | " | 80 | M—CN | 20 | — | | — | | 10,000 |
| 15 | " | 95 | M—COOCH$_2$—CHCH$_2$Cl<br>\|<br>OH | 5 | — | | — | | 28,000 |
| 16 | " | 90 | M—COOCH$_2$CHCH$_2$<br>\\ /<br>O | 5 | M—COOCH$_2$CHCH$_2$OC$_4$H$_9$<br>\|<br>OH | 5 | — | | 20,000 |
| 17 | " | 70 | M—COOCH$_2$CH$_2$N(CH$_3$)$_2$ | 25 | A—COOCH$_2$CHCH$_2$OC$_4$H$_9$<br>\|<br>OH | 5 | — | | 30,000 |
| 18 | " | 70 | A—COOCH$_2$CH$_2$N(CH$_3$)$_3$Cl$^-$ | 25 | M—COOCH$_2$CHCH$_2$<br>\\ /<br>O | 5 | — | | 35,000 |
| 19 | MCA | 80 | M—COOCH$_2$CHCH$_2$<br>\\ /<br>O | 5 | A—COO(CH$_2$CH$_2$O)$_3$H | 15 | — | | 25,000 |
| 20 | ACA | 77 | M—COOCH$_2$CHCH$_3$<br>\|<br>OH | 15 | M—COOCH$_3$ | 8 | — | | 15,000 |
| 21 | " | 75 | " | 20 | " | 5 | — | | 15,000 |
| 22 | " | 80 | A—CONHCH$_2$OH | 10 | " | 10 | — | | 23,000 |
| 23 | " | 75 | M—COOCH$_2$CH$_2$OH | 10 | A—COOC$_2$H$_5$ | 15 | — | | 25,000 |
| 24 | MCA | 65 | A—COOCH$_2$CHCH$_3$<br>\|<br>OH | 20 | M—COOCH$_3$ | 15 | — | | 13,000 |
| 25 | " | 70 | A—COOCH$_2$CH$_2$OH | 10 | A—COOC$_2$H$_5$ | 20 | — | | 27,000 |
| 26 | ACA | 75 | M—COOCH$_2$CHCH$_3$<br>\|<br>OH | 15 | A—CN | 10 | — | | 32,000 |
| 27 | " | 75 | " | 10 | " | 15 | — | | 18,000 |

TABLE 1-continued

| Example No. | Component (A) Monomer | Parts | Component (B) Comonomer | Parts | Comonomer | Parts | Comonomer | Parts | Remark* (cp) |
|---|---|---|---|---|---|---|---|---|---|
| 28 | " | 80 | A—CONHCH$_2$OH | 10 | M—CN | 10 | — | | 25,000 |
| 29 | " | 75 | M—COOCH$_2$CH$_2$OH | 10 | A—CN | 15 | — | | 20,000 |
| 30 | MCA | 75 | A—COOCH$_2$CHCH$_3$ \| OH | 10 | " | 15 | — | | 16,000 |
| 31 | " | 80 | A—COOCH$_2$CH$_2$OH | 10 | M—CN | 10 | — | | 22,000 |
| 32 | ACA | 70 | A—CONHCH$_2$OH | 15 | A—CN | 15 | — | | 5,000 |
| 33 | " | 75 | M—CONHCH$_2$OH | 15 | " | 10 | — | | 40,000 |
| 34 | " | 75 | " | 10 | " | 15 | — | | 18,000 |
| 35 | " | 80 | " | 10 | M—CN | 10 | — | | 25,000 |
| 36 | MCA | 75 | " | 10 | A—CN | 15 | — | | 16,000 |
| 37 | " | 80 | " | 10 | M—CN | 10 | — | | 22,000 |
| 38 | ACA | 77 | " | 15 | M—COOCH$_3$ | 8 | — | | 20,000 |
| 39 | " | 75 | " | 20 | " | 5 | — | | 15,000 |
| 40 | " | 80 | " | 10 | " | 10 | — | | 23,000 |
| 41 | " | 75 | " | 10 | A—COOC$_2$H$_5$ | 15 | — | | 25,000 |
| 42 | MCA | 65 | " | 20 | M—COOCH$_3$ | 15 | — | | 13,000 |
| 43 | " | 70 | " | 10 | A—COOC$_2$H$_5$ | 20 | — | | 27,000 |
| 44 | ACA | 80 | M—COOCH$_2$CHCH$_2$Cl \| OH | 5 | " | 15 | — | | 25,000 |
| 45 | " | 65 | M—COOCH$_2$CH$_2$N(CH$_3$)$_2$ | 25 | M—COOCH$_3$ | 10 | — | | 27,000 |
| 46 | " | 65 | A—COOCH$_2$CH$_2$N(CH$_3$)$_3$Cl$^-$ | 25 | M—CN | 10 | — | | 31,000 |
| 47 | " | 80 | M—COOCH$_2$CHCH$_2$ \\O/ | 5 | M—COOCH$_2$CHCH$_2$OC$_4$H$_9$ \| OH | 5 | M—COOCH$_3$ | 10 | 18,000 |
| 48 | MCA | 65 | " | 5 | A—COO(CH$_2$CH$_2$O)$_3$H | 15 | A—COOC$_2$H$_5$ | 15 | 25,000 |
| 49 | ACA | 77 | M—COOCH$_2$CHCH$_3$ \| OH | 10 | M—COO(CH$_2$CH$_2$O)$_z$H | 5 | M—COOCH$_3$ | 8 | 19,000 |
| 50 | " | 72 | A—CONHCH$_2$OH | 10 | M—COOCH$_2$CH$_2$N(CH$_3$)$_2$ | 10 | " | 8 | 22,000 |
| 51 | " | 75 | M—COOCH$_2$CH$_2$OH | 10 | M—COOCH$_2$CHCH$_2$ \\O/ | 5 | A—COOC$_2$H$_5$ | 10 | 25,000 |
| 52 | " | 75 | " | 10 | A—COOCH$_2$CHCH$_2$Cl \| OH | 5 | M—COOCH$_3$ | 10 | 20,000 |
| 53 | MCA | 65 | A—COOCH$_2$CHCH$_3$ \| OH | 10 | A—COOCH$_2$CH$_2$N(CH$_3$)$_3$Cl$^-$ | 15 | M—CN | 10 | 28,000 |
| 54 | " | 75 | " | 10 | A—COOCH$_2$CHCH$_2$OC$_4$H$_9$ \| OH | 5 | A—COOC$_2$H$_5$ | 10 | 23,000 |
| 55 | ACA | 77 | M—CONHCH$_2$OH | 10 | M—COO(CH$_2$CH$_2$O)$_z$H | 5 | M—COOCH$_3$ | 8 | 22,000 |
| 56 | " | 72 | " | 10 | M—COOCH$_2$CH$_2$N(CH$_3$)$_2$ | 10 | " | 8 | 22,000 |
| 57 | " | 75 | " | 10 | M—COOCH$_2$CHCH$_2$ \\O/ | 5 | A—COOC$_2$H$_5$ | 10 | 25,000 |
| 58 | " | 75 | " | 10 | A—COOCH$_2$CHCH$_2$Cl \| OH | 5 | M—COOCH$_3$ | 10 | 20,000 |
| 59 | MCA | 65 | " | 10 | A—COOCH$_2$CH$_2$N(CH$_3$)$_3$Cl$^-$ | 15 | M—CN | 10 | 28,000 |

TABLE 1-continued

| Example No. | Component (A) Monomer | Parts | Comonomer | Parts | Component (B) Comonomer | Parts | Comonomer | Parts | Remark* (cp) |
| --- | --- | --- | --- | --- | --- | --- | --- | --- | --- |
| 60 | " | 75 | " | 10 | A—COOCH$_2$CHCH$_2$OC$_4$H$_9$<br>            \|<br>            OH | 5 | A—COOC$_2$H$_5$ | 10 | 23,000 |

Note:
*Viscosity of a 20 wt % aqueous solution of copolymer at 20° C.
ACA: Acrylamide
MCA: Methacrylamide
A: CH$_2$=CH—
M: CH$_2$=C—
         |
         CH$_3$

EXAMPLE 61

In the same manner as in Example 1, aqueous solutions of acrylamide (85 parts)/2-hydroxypropyl methacrylate (15 parts) copolymer and acrylamide (87 parts)/methyl methacrylate (13 parts) copolymer were prepared, respectively. These aqueous copolymer solutions are mixed such that the weight ratio of the copolymers contained therein were 1/1, whereby a 10% aqueous solution of the copolymer blend was produced. (The viscosity of a 20% aqueous solution of the copolymer blend was 19,000 centipoises at 20° C.) Using the 10% copolymer blend solution, heat-sensitive recording papers were prepared and tested in the same manner as in Example 1 and it was found that they had excellent performance as well as those in Example 1.

EXAMPLE 62

In the same manner as in Example 61, a 10% aqueous solution of acrylamide (85 parts)/hydroxyethyl methacrylate (15 parts) copolymer and acrylamide (85 parts)/methyl methacrylate (15 parts) copolymer was prepared. (The viscosity of a 20% aqueous solution of the copolymer blend was 22,000 centipoises at 20° C.) When the 10% copolymer solution was used as a binder composition, the same results as in Example 61 were obtained.

EXAMPLE 63

| | |
| --- | --- |
| Acicular γ-iron oxide | 100 parts |
| Casein (20% aqueous solution) | 25 parts |
| Antifoaming agent | 0.5 part |
| Water | 100 parts |

The above composition was charge in a ball mill and dispersed for 1 hour to obtain a dispersion. To the dispersion was added 75 parts of a 20% aqueous solution of acrylamide (76 parts)/2-hydroxypropyl methacrylate (15 parts)/methyl methacrylate (9 parts) copolymer (viscosity at 20° C.: 16,000 centipoises) prepared in the same manner as in Example 1 and mixed, whereby a magnetic coating composition was prepared. The magnetic coating composition was coated on a high quality paper having a thickness of 180μ to form a magnetic recording layer 20μ thick (dry) by air knife coating. The thus-prepared magnetic recording paper had excellent performance in terms of abrasion resistance, running property and output level.

EXAMPLE 64

100 Parts of a 10% aqueous solution of acrylamide (85 parts)/2-hydroxypropyl methacrylate (15 parts) copolymer (viscosity of a 20% aqueous solution thereof: 18,000 centipoises at 20° C.) prepared in the same manner as in Example 1, 0.8 part of p-aminodiphenylamine diazonium chloride/formaldehyde condensate and 60 parts of water were fully mixed with stirring, whereby a light-sensitive coating composition was prepared. The coating composition was then coated on a high quality paper to form a light-sensitive layer having a thickness of 5μ (dry) by roll coating and dried at 80° C. for 30 minutes to obtain a light-sensitive recording paper.

While the invention has been described in detail and with reference to specific embodiments thereof, it will be apparent to one skilled in the art that various changes and modifications can be made therein without departing from the spirit and scope thereof.

What is claimed is:

1. A binder composition for paper-coating materials, comprising an aqueous solution of one or more copolymers of (A) 50 to 95 wt% of acryl- or methacrylamide and (B) 5 to 50 wt% of at least one acrylic- or methacrylic acid derivative represented by the formulae (I), (II) and (III):

$$CH_2=\overset{R_1}{\underset{|}{C}}-CN \qquad (I)$$

$$CH_2=\overset{R_1}{\underset{|}{C}}-CONH\overset{R_2}{\underset{|}{C}}HOH \qquad (II)$$

$$CH_2=\overset{R_1}{\underset{|}{C}}-COOR_3 \qquad (III)$$

wherein $R_1$ and $R_2$ each represents a hydrogen atom and methyl group; $R_3$ represents a $C_{1-4}$ alkyl group; a $C_{1-4}$ hydroxyalkyl group having 1 to 3 hydroxy group one of which may be replaced by a halogen atom or may form an ether bond with a $C_{1-4}$ alkyl group or a $C_{1-4}$ hydroxyalkyl group; or a cyclic ether by dehydration with an adjacent hydroxy group; —CH$_2$CH$_2$O)$_n$R$_4$; —CH$_2$CH$_2$N(R$_5$,R$_6$) and —CH$_2$CH$_2$⊕N(R$_5$,R$_6$,R$_7$)Z⊖; $R_4$ represents a hydrogen atom or a methyl group; $R_5$, $R_6$ and $R_7$ each represents a $C_{1-2}$ alkyl group; Z represents hydroxy ion or a halogen ion; and n is an integer of 2 to 25.

2. A binder composition as in claim 1, wherein the concentration of said copolymer in the aqueous solution is from 1 to 20 wt%.

3. A binder composition as in claim 1 or 2, wherein said acrylic- or methacrylic acid derivative (B) is represented by CH$_2$=CR$_1$—COOR$_8$, wherein $R_1$ represents hydrogen atom and methyl group and $R_8$ represents a $C_{1-4}$ hydroxyalkyl group having one hydroxy group.

4. A binder composition as in claim 1 or 2, wherein said acrylic- or methacrylic acid derivative (B) is a mixture of two monomers represented by $CH_2=CR_1-COOR_8$ and $CH_2=CR_1-COOR_9$, respectively, wherein $R_1$ represents hydrogen atom or a methyl group, $R_8$ represents a $C_{1-4}$ hydroxyalkyl group having one hydroxy group and $R_9$ represents a $C_{1-4}$ alkyl group.

5. A binder composition as in claim 1 or 2, wherein said copolymer is a copolymer of acryl- or methacrylamide, N-methylol acryl- or methacrylamide and acrylo- or methacrylonitrile.

6. A binder composition as in claim 1 or 2, wherein said aqueous solution contains two copolymers, one being a copolymer of acryl- or methacrylamide and an acrylic- or methacrylic acid derivative represented by $CH_2=CR_1-COOR_8$ and the other being a copolymer of acryl- or methacrylamide and an acrylic- or methacrylic acid derivative represented by $CH_2=CR_1-COOR_9$, wherein $R_1$ represents hydrogen atom and methyl group, $R_8$ represents a $C_{1-4}$ hydroxyalkyl group having one hydroxy group and $R_9$ represents a $C_{1-4}$ alkyl group.

7. A coating composition for heat-sensitive paper which comprises a leuco dye as a color former, a phenol compound or an organic acid as a color developer and a binder composition of claim 1.

8. A binder composition as in claim 1, wherein said one or more copolymers of (A) and (B) comprises copolymers of 70 to 90 wt. % of (A) and 10 to 30 wt. % of (B).

* * * * *